(12) United States Patent
Matsumoto et al.

(10) Patent No.: US 10,079,378 B2
(45) Date of Patent: Sep. 18, 2018

(54) POLYOLEFIN MICROPOROUS MEMBRANE AND PRODUCTION METHOD THEREOF

(71) Applicant: TORAY INDUSTRIES, INC., Tokyo (JP)

(72) Inventors: Tomiko Matsumoto, Tochigi (JP); Masami Sugata, Tochigi (JP); Koichi Kono, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/312,558

(22) PCT Filed: May 28, 2015

(86) PCT No.: PCT/JP2015/065357
§ 371 (c)(1),
(2) Date: Feb. 17, 2017

(87) PCT Pub. No.: WO2015/182691
PCT Pub. Date: Dec. 3, 2015

(65) Prior Publication Data
US 2017/0092920 A1    Mar. 30, 2017

(30) Foreign Application Priority Data
May 28, 2014  (JP) ................. 2014-110595

(51) Int. Cl.
*H01M 2/16*   (2006.01)
*H01M 2/14*   (2006.01)
(Continued)

(52) U.S. Cl.
CPC ........ *H01M 2/1653* (2013.01); *B01D 67/002* (2013.01); *B01D 67/0027* (2013.01);
(Continued)

(58) Field of Classification Search
CPC .. H01M 2/1653; H01M 2/145; B01D 67/002; B01D 67/0027; B01D 69/02;
(Continued)

(56) References Cited

U.S. PATENT DOCUMENTS 5,786,396 A * 7/1998 Takita ................ B01D 67/0009
                                                  210/500.42
5,922,492 A * 7/1999 Takita ....................... B32B 5/24
                                                  429/129
(Continued)

FOREIGN PATENT DOCUMENTS

CN      101155861 A    4/2008
EP      1785451 A1     5/2007
(Continued)

OTHER PUBLICATIONS

Lee et al. "Preparation and crystallization behavior of UHMWPE/LLDPE composites"; Polymer Bulletin 40, pp. 95-102. (Year: 1998).*

(Continued)

*Primary Examiner* — Gregg Cantelmo
(74) *Attorney, Agent, or Firm* — Kilpatrick Townsend & Stockton LLP (57) ABSTRACT

A polyolefin microporous membrane is disclosed. The membrane includes at least one microporous membrane layer, where the microporous membrane layer has an air permeability between about 100 sec/100 cc and about 220 sec/100 cc, a pin puncture strength of at least 550 gf, and a crystallization half time $t_{1/2}$ of from 10 to 35 minutes when subjected to isothermal crystallization at 117° C. The air permeability and the pin puncture strength are normalized to a thickness of 16 μm.

10 Claims, 1 Drawing Sheet

(51) Int. Cl.

| | | |
|---|---|---|
| B01D 67/00 | (2006.01) | |
| B01D 69/02 | (2006.01) | |
| B01D 71/26 | (2006.01) | |
| B29C 47/00 | (2006.01) | |
| B29C 47/16 | (2006.01) | |
| B29C 47/60 | (2006.01) | |
| B29C 47/88 | (2006.01) | |
| B29C 55/00 | (2006.01) | |
| B29C 55/14 | (2006.01) | |
| C08J 5/18 | (2006.01) | |
| C08J 9/28 | (2006.01) | |
| C08L 23/06 | (2006.01) | |
| B29C 47/40 | (2006.01) | |
| B29L 31/34 | (2006.01) | |
| B29K 23/00 | (2006.01) | |
| B29K 105/04 | (2006.01) | |

(52) U.S. Cl.
CPC ............ *B01D 69/02* (2013.01); *B01D 71/26* (2013.01); *B29C 47/0021* (2013.01); *B29C 47/0057* (2013.01); *B29C 47/16* (2013.01); *B29C 47/40* (2013.01); *B29C 47/6087* (2013.01); *B29C 47/8845* (2013.01); *B29C 55/005* (2013.01); *B29C 55/143* (2013.01); *C08J 5/18* (2013.01); *C08J 9/28* (2013.01); *C08L 23/06* (2013.01); *H01M 2/145* (2013.01); *B01D 2325/20* (2013.01); *B01D 2325/22* (2013.01); *B01D 2325/24* (2013.01); *B01D 2325/34* (2013.01); *B29K 2023/0683* (2013.01); *B29K 2105/041* (2013.01); *B29K 2995/0065* (2013.01); *B29L 2031/3468* (2013.01); *C08J 2201/0482* (2013.01); *C08J 2205/044* (2013.01); *C08J 2323/06* (2013.01); *C08J 2423/06* (2013.01); *C08L 2207/068* (2013.01)

(58) Field of Classification Search
CPC ............... B01D 71/26; B01D 2325/20; B01D 2325/22; B01D 2325/24; B01D 2325/34; B29C 47/0021; B29C 47/0057; B29C 47/16; B29C 47/40; B29C 47/6087; B29C 47/8845; B29C 55/005; B29C 55/143; C08J 5/18; C08J 9/28; C08J 2201/0482; C08J 2205/044; C08J 2323/06; C08J 2423/06; C08L 23/06; C08L 2207/068; B29K 2023/0683; B29K 2105/041; B29K 2995/0065; B29L 2031/3468
See application file for complete search history.

(56) References Cited

U.S. PATENT DOCUMENTS

| | | | | |
|---|---|---|---|---|
| 6,566,012 | B1 * | 5/2003 | Takita | B01D 71/26 210/500.42 |
| 6,666,969 | B1 * | 12/2003 | Funaoka | B01D 67/003 210/490 |
| 6,824,865 | B1 * | 11/2004 | Funaoka | B01D 67/0009 428/220 |
| 2004/0135278 | A1 * | 7/2004 | Akaishi | B29C 47/0021 264/41 |
| 2006/0177643 | A1 | 8/2006 | Kondo et al. | |

FOREIGN PATENT DOCUMENTS

| | | | | |
|---|---|---|---|---|
| EP | 2169742 | A1 | | 3/2010 |
| JP | 2002-256099 | A | | 9/2002 |
| JP | 2005209452 | A | * | 8/2005 |
| JP | 2009-091461 | A | | 4/2009 |
| JP | 2009-132904 | A | | 8/2009 |
| JP | 2010-024463 | A | | 2/2010 |
| JP | 2010-540744 | A | | 12/2010 |
| JP | 2011-140633 | A | | 7/2011 |
| JP | 2012-221889 | A | | 11/2012 |
| KR | 2013-0087367 | A | | 8/2013 |
| WO | 2000/049074 | A1 | | 8/2000 |
| WO | 2004/085525 | A1 | | 10/2004 |
| WO | WO-2007003085 | A1 | * | 1/2007 ........... B29C 55/143 |
| WO | 2009/044227 | A1 | | 4/2009 |
| WO | 2010/114672 | A1 | | 10/2010 |
| WO | 2011/152201 | A1 | | 12/2011 |

OTHER PUBLICATIONS

Minkova et al. "Blends of normal high density and ultra-high molecular weight polyethylene, gamma irradated at a low does"; Colloid and Polymer Science 268, pp. 1018-1023. (Year: 1990).*
Kitamaru et al. "A Commentary Remark on the Isothermal Crystallization of a Polyethylene Gel from the Stretched Molten State"; Bull. Inst. Chem. Res., Kyoto Univ., vol. 46(2), pp. 97-106. (Year: 1968).*
Song et al. "Effect of small amount of ultra high molecular weight component on the crystallization behaviors of bimodal high density polyethylene"; Polymer 49, pp. 2964-2973. (Year: 2008).*
International Search Report and Written Opinion of PCT/JP2015/065357, dated Aug. 8, 2015, all pages.
International Preliminary Report on Patentability of PCT/JP2015/065357, dated Nov. 29, 2016, all pages.
Extended European Search Report dated Feb. 28, 2017 in European Patent Application No. 15799174.6, 9 pages.

* cited by examiner

POLYOLEFIN MICROPOROUS MEMBRANE AND PRODUCTION METHOD THEREOF This application is a United States National Phase Application of co-pending International Patent Application Number PCT/JP2015/065357, filed May 28, 2015 and entitled "POLYOLEFIN MICROPOROUS MEMBRANE AND METHOD FOR PRODUCING SAME", which Application claims priority to Japanese Patent Application Number 2014-110595, filed with the Japanese Patent Office on May 28, 2014, the contents of which are incorporated herein by reference in their entirety.

TECHNICAL FIELD

The present invention relates to a polyolefin microporous membrane and a production method thereof.

BACKGROUND ART

Polyolefin microporous membranes are used as microfiltration membranes, separators for batteries, separators for fuel cells, separators for capacitors, and the like. Of these, polyolefin microporous membranes are suitably used as separators for lithium ion batteries due to their shut-down characteristics and excellent pin puncture strength of the membranes.

In recent years, the application of lithium ion batteries to automobiles, equipment for outdoor use, and the like has been investigated, and there is a need for larger batteries. Accordingly, there is also a demand for wide separators, with 100 mm or greater in width for example, which are incorporated into such batteries. However, polyolefin microporous membranes used in separators have a tendency to curl markedly as the width increases. Such curling in a separator impairs the processability, and it becomes difficult to obtain a roll of a polyolefin microporous membrane with a good winding. Meanwhile, increases in the width or length, decreases in membrane thickness, and increases in the production speed of a microporous membrane roll product have been investigated in order to improve productivity. However, these changes may lead to the manifestation of the problems described above as well.

Patent Document 1 (Japanese Unexamined Patent Application Publication No. 2011-140633A) discloses a polypropylene film roll, which has excellent productivity, exhibits excellent battery characteristics when used in a separator of a storage device, and has enhanced processing suitability in the battery production process. However, the obtained film was not able to provide sufficiently high strength and high permeability simultaneously.

Patent Document 2 (Japanese Unexamined Patent Application Publication No. 2009-132904A) discloses a film prepared by stretching a polyethylene gel-like sheet having a weight average molecular weight of $3.8 \times 10^5$ by 8.5 times in the MD direction and by 5 times in the TD direction sequentially, washing and drying off the membrane-forming solvent, and then stretching the sheet by 3.0 times in the MD direction and by 1.2 times in the TD direction in a restretching process. Patent Document 3 (Japanese Unexamined Patent Application Publication No. 2010-24463A) discloses a film prepared by removing part of a solvent from a gel-like sheet made of ultra-high molecular weight polyethylene having a weight average molecular weight of $2.0 \times 10^6$ and high-density polyethylene having a weight average molecular weight of $3.5 \times 10^5$ and then stretching the sheet by 5 times in the MD direction and by 10 times in the TD direction sequentially. However, both of these inventions were not able to achieve excellent pin puncture strength and air permeability simultaneously. Also, they were not able to improve the appearance (wrinkles, winding deviation) sufficiently when formed into a roll.

Patent Document 4 (Japanese Unexamined Patent Application Publication No. 2012-221889A) describes a multilayer, porous membrane having excellent resistance against curling. However, the disclosure only describes the reduction of curling in a multilayer, porous membrane obtained by forming a porous layer on the surface of a polyolefin microporous membrane, and does not describe the reduction of curling in the polyolefin microporous membrane itself, which serves as a base material.

CITATION LIST

Patent Literature

Patent Document 1: Japanese Unexamined Patent Application Publication No. 2011-140633
Patent Document 2: Japanese Unexamined Patent Application Publication No. 2009-132904
Patent Document 3: Japanese Unexamined Patent Application Publication No. 2010-24463
Patent Document 4: Japanese Unexamined Patent Application Publication No. 2012-221889

SUMMARY OF INVENTION

The present invention relates to a polyolefin microporous membrane which has excellent pin puncture strength and air permeability, which were conventionally difficult to achieve simultaneously. The polyolefin microporous membrane also suppresses the curling even when used as a relatively wide member, and yields a roll with no wrinkle or winding deviation.

Technical Problem

An object of the present invention is to provide a polyolefin microporous membrane having excellent pin puncture strength and air permeability, having suppressed curling, and having an excellent appearance without wrinkles or winding deviation when formed into a roll; and a production method thereof.

Solution to Problem

As a result of conducting dedicated research in order to solve the problems described above, the present inventors discovered that the problems can be solved with the configuration described below, thereby completing the present invention. That is, the present invention is as follows.

(1) A polyolefin microporous membrane having an air permeability normalized to a thickness of 16 µm of from 100 to 220 sec/100 cc, a pin puncture strength normalized to a thickness of 16 µm of not less than 550 gf, and a crystallization half time $t_{1/2}$ of from 10 to 35 minutes when subjected to isothermal crystallization at 117° C.

(2) The polyolefin microporous membrane according to (1) above, wherein a curl is not more than 2 mm.

(3) The polyolefin microporous membrane according to (1) or (2) above, wherein a thickness is from 5 to 30 µm.

(4) The polyolefin microporous membrane according to any one of (1) to (3) above, wherein the polyolefin contains not less than 30 wt. % of an ultra-high molecular weight polyethylene having a weight average molecular weight of not less than $1.0 \times 10^6$ and less than $2.0 \times 10^6$.

(5) The polyolefin microporous membrane according to any one of (1) to (4) above, wherein a shrinkage in a transverse direction at 105° C. is less than 6%, and a shrinkage in a longitudinal direction at 105° C. is from 1.1 to 2.0 times the shrinkage in the transverse direction.

(6) A separator for a non-aqueous electrolyte secondary battery comprising the polyolefin microporous membrane described in any one of (1) to (5) above.

(7) A non-aqueous electrolyte secondary battery comprising the separator described in (6) above.

(8) A production method for the polyolefin microporous membrane according to any one of (1) to (5) above, the method comprising the following steps:

(a) preparing a polyolefin solution by melt-kneading (i) a polyolefin resin containing an ultra-high molecular weight polyethylene having a weight average molecular weight of not less than $1.0 \times 10^6$ and less than $2.0 \times 10^6$; and (ii) a membrane-forming solvent;

(b) molding a gel-like sheet by extruding the molten mixture obtained in step (a) from an extruder to form an extrudate and then cooling the extrudate;

(c) stretching the gel-like sheet obtained in step (b) in a longitudinal direction (machine direction);

(d) stretching the sheet obtained in step (c) in a transverse direction (direction orthogonal to the machine direction) sequentially;

(e) extracting a membrane-forming solvent from the stretched film obtained in step (d); and (f) drying the microporous membrane obtained in step (e).

(9) The production method for a polyolefin microporous membrane according to (8) above, wherein a crystallization half time $t_{1/2}$ of the gel-like sheet obtained in step (b) is from 10 to 35 minutes when subjected to isothermal crystallization at 117° C.

Advantageous Effects of Invention

The polyolefin microporous membrane of the present invention has excellent pin puncture strength and air permeability, suppressed curling, and an excellent appearance when formed into a roll, which makes the membrane suitable as a separator for a lithium ion secondary battery.

DESCRIPTION OF EMBODIMENTS

As a result of diligent research in order to obtain a polyolefin microporous membrane having excellent pin puncture strength and air permeability as well as suppressed curling, the present inventors discovered that the crystallization half time within a certain range during isothermal crystallization at 117° C. can reduce the difference in cooling temperature between the two surfaces of a gel-like sheet in the cooling step. This leads to suppression in curling even after stretching, and a resulting polyolefin microporous membrane can achieve excellent pin puncture strength and air permeability.

The present invention will be described in detail hereinafter.

[1] Polyolefin Resin

The polyolefin resin used in the polyolefin microporous membrane of the present invention is preferably a polyolefin resin containing a polyethylene as a main component. In order to improve the permeability and pin puncture strength, the ratio of polyethylene is preferably not less than 80 wt. % and more preferably not less than 90 wt. % based on 100 wt. % of the total amount of the polyolefin resin, and it is even more preferable to use the polyethylene alone.

The polyethylene is preferably a homopolymer of ethylene but may also be a copolymer that contains a small amount of other α-olefins. Examples of other α-olefins include propylene, 1-butene, 1-hexene, 1-pentene, 4-methyl-1-pentene, octene, vinyl acetate, methyl methacrylate, styrene, and the like.

Here, types of polyethylene include high-density polyethylene having a density exceeding 0.94 g/cm$^3$, medium-density polyethylene having a density in the range of from 0.93 to 0.94 g/cm$^3$, low-density polyethylene having a density lower than 0.93 g/cm$^3$, straight-chain low-density polyethylene, and the like. In order to increase the pin puncture strength, the polyolefin resin composition preferably contains a high-density polyolefin. The weight average molecular weight (Mw hereinafter) of the high-density polyethylene is preferably not less than $1 \times 10^5$ and more preferably not less than $2 \times 10^5$. The upper limit of the Mw is preferably $8 \times 10^5$ and more preferably $7 \times 10^5$. When the Mw is within the range described above, it is possible to achieve both stability of membrane formation and the pin puncture strength obtained as a result.

In the present invention, it is important for the polyethylene to contain an ultra-high molecular weight polyethylene. The ultra-high molecular weight polyethylene is preferably a homopolymer of ethylene but may also be a copolymer that contains a small amount of other α-olefins. Other α-olefins other than ethylene may be the same as those described above.

The Mw of the ultra-high molecular weight polyethylene is preferably not less than $1 \times 10^6$ and less than $2 \times 10^6$. The use of an ultra-high molecular weight polyethylene with an Mw within the range described above makes it possible to produce finer pores and fibrils without impairing productivity, which makes it possible to increase the pin puncture strength. The lower limit of the content of the ultra-high molecular weight polyethylene is preferably 30 wt. %, more preferably 40 wt. %, and even more preferably 50 wt. % based on 100 wt. % of the total amount of the polyolefin resin. The upper limit is preferably 80 wt. % and more preferably 70 wt. %. When the content of the polyolefin resin is within this range, it becomes easy to achieve both pin puncture strength and air permeability with the membrane production method described below. In addition, the use of the high-density polyethylene and the ultra-high molecular weight polyethylene at the composition ratio described above makes it possible to adjust the crystallization half time $t_{1/2}$ to within a specific range during isothermal crystallization at 117° C.

A low-density polyethylene, a straight-chain low-density polyethylene, an ethylene/α-olefin copolymer produced by a single-site catalyst, and a low molecular weight polyethylene having a weight average molecular weight of from 1,000 to 4,000 may be added as other polyolefins in a range of from 0 to 10 wt. % of the polyolefin resin. This can provide a shut-down function at low temperature and improve the characteristics as a battery separator.

Meanwhile, adding a polypropylene can improve the melt-down temperature when the polyolefin microporous membrane of the present invention is used as a separator for a battery. Types of polypropylenes that can be used include block copolymers and random copolymers in addition to homopolymers. Block copolymers and random copolymers may include copolymer ingredients with α-olefins other than propylene, and ethylene is preferable as such a α-olefin. The compounded amount of the polypropylene is preferably from 0 to 10 wt. % of the polyolefin resin.

In addition, the polyolefin microporous membrane of the present invention may include various additives such as an antioxidant, a heat stabilizer, an anti-static agent, and an ultra-violet absorbent as well as a blocking retardant as long as these additives do not impair the effect of the present invention. In particular, in order to prevent oxidation degradation of the polyethylene resin due to thermal history, it is preferable to add an antioxidant.

It is preferable that the polyolefin microporous membrane of the present invention contains substantially no inorganic particles. The expression "contains substantially no inorganic particles" means that the content of inorganic elements determined by X-ray fluorescence spectroscopy, for example, is not more than 300 ppm, preferably not more than 100 ppm, and most preferably not more than the detection limit. This is because contamination originating from foreign substances, the raw material resin or desquamation of dirt deposited on the processing line or apparatus in the polyolefin microporous membrane manufacturing processes may be present in the membranes, even if such particles are not added intentionally.

[2] Production Method for Polyolefin Microporous Membrane

Next, the production method of the polyolefin microporous membrane of the present invention will be described in detail, but the method is not limited to this embodiment.

The production method of the polyolefin microporous membrane of the present invention includes the following steps:

(a) a step of preparing a polyolefin solution by melt-kneading (i) a polyolefin resin containing an ultra-high molecular weight polyethylene having a weight average molecular weight of not less than $1.0 \times 10^6$ and less than $2.0 \times 10^6$; and (ii) a membrane-forming solvent;

(b) a step of molding a gel-like sheet by extruding the polyolefin solution obtained in step (a) from an extruder to form an extrudate and then cooling the extrudate;

(c) a step of stretching the gel-like sheet obtained in step (b) in a longitudinal direction (machine direction);

(d) a step of stretching the sheet obtained in step (c) in a transverse direction (direction orthogonal to the machine direction) sequentially;

(e) a step of extracting a membrane-forming solvent from the stretched film obtained in step (d); and (f) a step of drying the microporous membrane obtained in step (e).

Other steps such as hydrophilization treatment, discharging treatment, and restretching may also be added before, during or after steps (c) to (f).

(a) Preparation of Polyolefin Solution

A polyolefin solution is prepared by dissolving a polyolefin resin in a membrane-forming solvent while heating. The membrane-forming solvent is not particularly limited as long as the membrane-forming solvent is a solvent sufficiently capable of dissolving the polyethylene. In order to enable stretching at a relatively high ratio, the membrane-forming solvent is preferably a liquid at room temperature.

Examples of liquid solvents include aliphatic, cycloaliphatic, or aromatic hydrocarbons such as nonane, decane, decalin, paraxylene, undecane, dodecane, and liquid paraffin, mineral oil distillates having boiling points corresponding to those of the aforementioned hydrocarbons, and phthalic acid esters which are liquids at room temperature such as dibutylphthlate and dioctylphthalate. In order to obtain a gel-like sheet having a stable liquid solvent content, it is preferable to use a non-volatile liquid solvent such as liquid paraffin. The composition may mix with the polyethylene in the melt-kneaded state, but a solid solvent may also be mixed into the liquid solvent at room temperature. Examples of such a solid solvent include stearyl alcohol, ceryl alcohol, and paraffin wax. However, when a solid solvent is used alone, there is a risk that stretching unevenness or the like may occur.

From the perspective of enhancing the formability of the extrudate, the compounding ratio of the polyolefin resin and the membrane-forming solvent is preferably such that the polyolefin resin constitutes from 10 to 50 wt. % based on 100 wt. % of the total amount of the polyolefin resin and the membrane-forming solvent. The lower limit of the content of the polyolefin resin is more preferably 20 wt. %. The upper limit is more preferably 40 wt. % and even more preferably 35 wt. %. When the content of the polyolefin resin is not less than 10 wt. %, the swelling or neck-in formation is small at the outlet of the die when forming the composition into a sheet shape, so the formability and membrane forming characteristics of the sheet become favorable. In addition, when the content of the polyolefin resin is not more than 50 wt. %, the contraction in the thickness direction is small, so the forming processability and membrane forming characteristics become favorable. When the content of the polyolefin resin is within this range, it becomes easy to achieve both excellent pin puncture strength and air permeability with the membrane production method described below, and it also becomes possible to control the coefficient of friction of the front and back of the membrane.

The viscosity of the membrane-forming solvent is preferably from 20 to 200 cSt at 40° C. When the viscosity at 40° C. is not less than 20 cSt, it becomes easy to get the uniform sheet formed by extruding the polyolefin solution from a die. On the other hand, when the viscosity of the liquid solvent is not more than 200 cSt, it becomes easy to remove the membrane-forming solvent.

The uniform melt-kneading of the polyolefin solution is not limited to a particular implementation, but is preferably performed in an extruder, for example, a twin-screw extruder, in particular, when preparing a high-concentration polyolefin solution. Various additives such as an antioxidant may also be added within a range that does not impair the effect of the present invention. An antioxidant is preferably added in order to prevent the oxidation of the polyethylene, in particular.

In the extruder, the polyolefin solution is mixed uniformly at a temperature at which the polyolefin resin melts completely. The melt-kneading temperature differs depending on the polyolefin resin that is used. The lower limit thereof is preferably (the melting point of the polyolefin resin+10° C.) and is more preferably (the melting point of the polyolefin resin+20° C.). The upper limit is preferably (the melting point of the polyolefin resin+120° C.) and is more preferably (the melting point of the polyolefin resin+100° C.). Here, the melting point is a value measured by DSC according to JIS K 7121 (1987) (the same applies hereinafter). For example, specifically, because the polyethylene composition has a melting point of about 130 to 140° C., the lower limit of the melt-kneading temperature is preferably 140° C., more preferably 160° C., and most preferably 170° C. The upper limit is preferably 250° C., more preferably 230° C., and most preferably 200° C.

In addition, the melt-kneading temperature for the polyolefin solution containing polypropylene is preferably from 190 to 270° C.

A ratio of the length L to the diameter D of a screw of a twin-screw extruder, L/D, is preferably from 20 to 100, from the viewpoint of better kneading processability and better resin dispersion and distributivity.

In order to achieve good dispersion of polyolefin in the extrudate and to obtain excellent thickness uniformity for the microporous membrane, a screw rotation speed Ns of the twin-screw extruder is preferably from 150 to 600 rpm.

(b) Extrudate Formation and Gel-Like Sheet Forming

The polyolefin solution melt-kneaded in the extruder is extruded from the die directly or via yet another extruder to obtain an extrudate so that thickness of the microporous membrane of the final product is from 5 to 100 μm. A rectangular T-die may be used as a die. When a T-die is used, the slit gap of the die is preferably from 0.1 to 5 mm from the perspective of facilitating the control of the thickness of the microporous membrane of the final product, and it is preferable to heat the composition to 140 to 250° C. at the time of extrusion.

A gel-like sheet is obtained by cooling the resulting extrudate, and cooling makes it possible to fix the microphase of the polyethylene that is separated by the membrane-forming solvent. In the cooling step, it is preferable to cool the sheet to a temperature not higher than the crystallization completion temperature. Cooling is preferably performed at a rate of not less than 250° C./min and more preferably at a rate of not less than 300° C./min until a temperature not higher than the crystallization completion temperature is reached on both the front and back of the gel-like sheet. When the cooling rate is within the range described above, the crystals which form the gel are not coarsened, resulting in a fine high-order structure. This suppresses the non-uniformity in the surface roughness. In addition, the fine high-order structure facilitates the molecular orientation during the subsequent stretching, which makes it possible to achieve both excellent pin puncture strength and air permeability simultaneously and to suppress the curling. Here, the crystallization completion temperature is the extrapolated crystallization completion temperature measured in accordance with JIS K7121 (1987). Specifically, a polyethylene has an extrapolated crystallization completion temperature of from approximately 70 to 90° C. The cooling rate described here can be determined by the time required for the temperature of the resin at the outlet of the extruder to reach the crystallization completion temperature and the temperature difference between the resin temperature at the outlet of the extruder and the crystallization completion temperature. Therefore, when cooling to a temperature not higher than the crystallization completion temperature in the cooling step, the cooling rate is determined by dividing the difference between the resin temperature at the outlet of the extruder and the gel-like sheet temperature on each of the front and back at the outlet in the cooling step by the time required to complete the cooling step. The crystallization half time $t_{1/2}$ within a certain range during the isothermal crystallization of the gel-like sheet at 117° C. can suppress the difference between the cooling rate of one surface (front surface) and the cooling rate of the other surface (back surface) of the gel-like sheet. Thus, a microporous membrane with suppressed curling after stretching can be obtained.

Examples of cooling methods for the extrudate include a method of bringing the extrudate into direct contact with cold air, cold water, or other cooling media, a method of bringing the extrudate into contact with a roll that has been cooled with a cooling medium, and a method using a casting drum or the like. The solution that is extruded from the die is drawn at a prescribed draw ratio before or during cooling. The lower limit of the draw ratio is preferably not less than 1. The upper limit is preferably not more than 10 and more preferably not more than 5.

The lower limit of the thickness of the gel-like sheet is preferably 0.5 mm and more preferably 0.7 mm. The upper limit is 3 mm and more preferably 2 mm. If the thickness of the gel-like sheet is not more than 3 mm, formation of structural irregularities in the thickness direction during the cooling process can be suppressed. As a result, the denser high-order structure can be achieved over the entire thickness direction, thus the structure on both the front and back can be dense. In addition, if the thickness of the gel-like sheet is not more than 3 mm, the cooling rate of the gel-like sheet can be easily controlled to fall within the preferable range described above.

The polyolefin microporous membrane of the present invention is not limited to a single layer and may also be a laminate formed by laminating several microporous membranes (layers). The additional laminated layers may each contain desired resins to a degree that does not impair the effect of the present invention in addition to the polyethylene, as described above. A conventional method may be used as the method for forming the polyolefin microporous membrane into a laminate. For example, there is a method of forming a laminate by preparing desired resins as necessary, supplying the resins to an extruder separately and melting the resins at a desired temperature, making the resins merge in a polymer tube or a die, and extruding the mixture from a slit-shaped die at each target laminate thickness.

(c) Stretching in the Longitudinal Direction and (d) Stretching in the Transverse Direction During the production of the polyolefin microporous membrane of the present invention, the gel-like sheet obtained in step (b) is sequentially stretched by stretching in the longitudinal direction (machine direction, MD) (step (c)) and then stretching in the transverse direction (direction orthogonal to the machine direction, TD) (step (d)). Sequentially and consecutively performing stretching in the longitudinal direction and stretching in the transverse direction separately tends to improve the pin puncture strength and the air permeability simultaneously. Stretching is performed at a prescribed ratio by means of an ordinary tenter method, a roll method, or a combination thereof while the gel-like sheet is heated.

In the stretching method of the present invention, stretching in the longitudinal direction and stretching in the transverse direction are performed separately, so molecular orientation tends to progress easily due to the stretching tension being applied only in each direction in each stretching step. Therefore, it is possible to achieve a higher pin puncture strength than in the case of simultaneous stretching, even at the same area magnification.

The stretching ratio differs depending on the thickness of the gel-like sheet, but the sheet is preferably stretched by not less than 5 times in each direction.

Stretching in the longitudinal direction is preferably performed by not less than 5 times and more preferably not less than 7 times. The upper limit is preferably 8 times and more preferably 10 times. If the stretching in the longitudinal direction is within the range described above, it is possible to impart high strength due to the stretching orientation, and to reduce incidents of breaking due to stretching.

Stretching in the transverse direction is preferably performed by not less than 4 times and more preferably not less than 6 times. The upper limit is preferably 10 times and more preferably 12 times. If the stretching in the transverse direction is within the range described above, it is possible to impart high strength due to the stretching orientation, and to reduce incidents of breaking due to stretching.

The area magnification combining stretching in the longitudinal direction and stretching in the transverse direction is preferably not less than 25 times, more preferably not less than 30 times, and most preferably not less than 42 times.

The stretching temperature is preferably not more than the melting point of the polyolefin resin and is more preferably in a range of (the crystalline dispersion temperature Tcd of the polyolefin resin) to (the melting point of the polyolefin resin). If the stretching temperature is within the temperature range described above, the molecular chains can be efficiently oriented by stretching, and the stretching tension can be reduced. This yields good membrane productivity, suppresses membrane puncture during stretching, and enables stretching at a high ratio.

Specifically, because the polyethylene resin has a crystalline dispersion temperature of about 90 to 100° C., the longitudinal direction stretching temperature is preferably not less than 80° C. The upper limit is preferably 130° C., more preferably 125° C., and most preferably 120° C. The crystalline dispersion temperature Tcd can be determined from the temperature characteristics of the dynamic viscoelasticity measured in accordance with ASTM D 4065. Also it can be obtained by NMR.

The stretching described above can create cleavages in higher-order structure formed in the gel-like sheet, refine crystalline phase and form a multiplicity of fibrils. The fibrils form a mesh structure with three-dimensional irregular linkages. The stretching improves the mechanical strength and expands the fine pores, which is suitable for a battery separator.

In the present invention, it is preferable to perform sequential stretching before removing the membrane-forming solvent in the gel-like sheet. The cleavage of the high-order structure becomes smooth due to stretching prior to the removal of the membrane-forming solvent, which makes it possible to uniformly refine the crystal phase.

(e) Extraction (Washing) of Membrane-Forming Solvent from Stretched Membrane

Next, the membrane-forming solvent remaining in the gel-like sheet is extracted/removed—that is, washed—using a washing solvent. Since the polyolefin phase and the membrane-forming solvent phase are separated, a microporous membrane is obtained as a result of the removal of the membrane-forming solvent. Examples of washing solvents are readily volatile solvents including saturated hydrocarbons such as pentane, hexane, and heptane; chlorinated hydrocarbons such as methylene chloride and carbon tetrachloride; ethers such as diethyl ether and dioxane; ketones such as methyl ethyl ketone; chain fluorocarbons such as ethane trifluoride, $C_6F_{14}$, and $C_7F_{16}$; cyclic hydrofluorocarbons such as $C_5H_3F_7$; hydrofluoroethers such as $C_4F_9OCH_3$ and $C_4F_9OC_2H_5$; and perfluoroethers such as $C_4F_9OCF_3$ and $C_4F_9OC_2F_5$. These washing solvents are appropriately selected according to the membrane-forming solvent that is used, and can be used alone or in combination thereof.

The washing method may be a method of immersing the gel-like sheet in a washing solvent and then extracting the sheet, a method of showering the gel-like sheet with a washing solvent, or a method comprising a combination thereof. The amount of washing solvent that is used differs depending on the washing method but is typically preferably not less than 300 parts by weight per 100 parts by weight of the gel-like sheet. The washing temperature may be from 15 to 30° C. and may be increased as necessary to an upper limit of 80° C.

Washing such as that described above is preferably performed until the residual solvent in the gel-like sheet—that is, the microporous membrane—after washing is less than 1 wt. %.

(f) Drying the Microporous Membrane

After washing, the washing solvent is dried and removed. The method of drying is not particularly limited, but the solvent may be dried by heat drying, air drying, or the like. The drying temperature is preferably not higher than the crystalline dispersion temperature Tcd of the polyethylene composition and is particularly preferably not lower than (Tcd −5° C.). Drying is preferably performed until the residual washing solvent is not more than 5 wt. % and more preferably not more than 3 wt. % on the basis of 100 wt. % of the dry weight of the microporous membrane.

(g) Other Steps

Stretching may be performed further in the longitudinal direction (MD), the transverse direction (TD), or both directions simultaneously by approximately 5% to 20% (called "restretching" hereafter) after washing and drying in order to enhance the mechanical strength such as the pin puncture strength.

The stretched membrane or microporous membrane after stretching may be subjected to heat setting treatment and/or heat relaxing treatment. The crystals are stabilized by heat setting treatment and heat relaxing treatment, which makes it possible to produce a microporous membrane having a homogenized lamellar layer, a large pore size, and excellent strength. Heat setting treatment is performed at a temperature in the range of the crystal dispersion temperature or higher to the melting point or lower of the polyolefin resin constituting the polyolefin microporous membrane. Heat setting treatment is performed with a tenter method, a roll method, or a rolling method.

For example, a method disclosed in Japanese Unexamined Patent Application Publication No. 2002-256099A can be used as the heat relaxing treatment method.

Furthermore, hydrophilization treatment may also be applied to the stretched membrane or the microporous membrane in accordance with the application. Hydrophilization treatment can be performed by monomer graft, surfactant treatment, corona discharge and the like. Monomer graft is preferably performed before the crosslinking treatment.

In the case of surfactant treatment, a nonionic surfactant, a cationic surfactant, an anionic surfactant, and an amphoteric surfactant may be used, but a nonionic surfactant is preferable. The microporous membrane is immersed in a solution prepared by dissolving a surfactant in a lower alcohol such as methanol, ethanol, or isopropyl alcohol, or the solution is applied to the microporous membrane with a doctor blade method.

Corona discharge treatment may also be performed on at least one surface of the stretched membrane or the microporous membrane as necessary in air, nitrogen, or a mixed atmosphere of carbon dioxide gas and nitrogen.

[3] Structure and Physical Properties of Polyolefin Microporous Membrane

The following physical properties represent a preferable embodiment of the polyolefin microporous membrane of the present invention.

(1) Crystallization Half Time $t_{1/2}$ During Isothermal Crystallization at 117° C.

The crystallization half time $t_{1/2}$ of the polyolefin microporous membrane of the present invention during isothermal crystallization at 117° C. is from 10 to 35 minutes, preferably from 10 to 30 minutes, more preferably from 12 to 25 minutes, and even more preferably from 13 to 22 minutes. The crystallization half time $t_{1/2}$ during isothermal crystallization at 117° C. in the present invention refers to the amount of time required for the area of a heat absorption peak obtained in a differential scanning calorimetric (DSC) isothermal crystallization measurement (117° C.) to be half of the total area. The detailed measurement method is described below.

The crystallization half time $t_{1/2}$ during isothermal crystallization at 117° C. may be a value determined by measuring a gel-like sheet obtained by cooling a molten mixture of a polyolefin resin and a membrane-forming solvent, or a value measured using a sample obtained by melt-kneading a polyolefin microporous membrane together with a membrane-forming solvent such as liquid paraffin so that the solid content is 25 wt. % and then cooling the mixture.

When melt-kneading the polyolefin microporous membrane with the membrane-forming solvent, the membrane-forming solvent described above can be used. Specifically, liquid paraffin is preferable. The melt-kneading temperature is preferably a temperature equal to the melt-kneading temperature when uniformly mixing the polyolefin solution described above. Specifically, the melt-kneading temperature is preferably in the range of from 130° C. to 250° C. and more preferably in the range of from 140° C. to 230° C.

If the crystallization half time $t_{1/2}$ during isothermal crystallization at 117° C., which is measured from a sample obtained from a 25 wt. % membrane-forming solvent of a gel-like sheet or a polyolefin microporous membrane, is within the range described above, the difference in cooling temperature between both surfaces becomes small in the cooling step, resulting in a microporous membrane with suppressed cooling after sequential stretching.

(2) Air Permeability

The upper limit of the air permeability of the polyolefin microporous membrane of the present invention is 400 sec/100 ccAir/16 μm more preferably 300 sec/100 ccAir/16 μm, and even more preferably 200 sec/100 ccAir/16 μm. The lower limit is 50 sec/100 ccAir/16 μm, preferably 70 sec/100 ccAir/16 μm, and even more preferably 100 sec/100 ccAir/16 μm. When the air permeability is not less than 400 sec/100 ccAir/16 μm, the ion permeability is good, and charging and discharging can be performed at a high speed. When the air permeability is not less than 50 sec/100 cc Air/16 μm, the degradation of a battery can be prevented.

(3) Pin Puncture Strength

The pin puncture strength of the polyolefin microporous membrane of the present invention is not less than 500 gf/16 μm and preferably 550 gf/16 μm. When the pin puncture strength is not less than 550 gf/16 μm, the shorting of electrodes does not occur upon assembling a battery using the polyolefin microporous membrane as a separator, and the safety of the battery thus increases.

(4) Ratio of Pin Puncture Strength to Air Permeability

The lower limit of the ratio of the pin puncture strength to the air permeability of the polyolefin microporous membrane of the present invention (pin puncture strength [gf]/air permeability [sec/100 ccAir]: both normalized to a thickness of 16 μm) is preferably 2.0 and more preferably 2.5. The upper limit is preferably 5.5. When the ratio of the pin puncture strength to the air permeability is not less than 2.0 and not more than 5.5, the product yields and excellent balance of safety and ion permeability when the polyolefin microporous membrane is incorporated to a battery as a separator.

(5) Shrinkage at 105° C.

The shrinkage at 105° C. of the polyolefin laminate microporous membrane of the present invention is preferably less than 6% in the transverse direction, and the ratio of the thermal shrinkage in the longitudinal direction and the transverse direction is preferably from 1.1 to 2.0. If the ratios are within the ranges described above, it is possible to impart excellent high-temperature safety to the battery when the porous film of the present invention is used as a separator for a lithium ion battery. If the shrinkages of the polyolefin laminate microporous membrane of the present invention are within the ranges described above, the shrinkage of the polyolefin laminate microporous membrane inside the battery is sufficiently small when the battery reaches a high-temperature state, thus preventing a contact between electrodes inside the battery. Since the internal shorting of the battery at high temperatures can be prevented, the polyolefin laminate microporous membrane of the present invention can impart excellent safety to the battery.

(6) Curling

The polyolefin microporous membrane of the present invention preferably has a curl of not more than 2 mm. Here, curl refers to a value measured with the measurement method described below.

(7) Porosity

The upper limit of the porosity of the polyolefin microporous membrane is preferably 70%, more preferably 60%, and most preferably 55%. The lower limit is preferably 30%, more preferably 35%, and most preferably 40%. If the porosity is not more than 70%, sufficient mechanical strength and insulation can be obtained, and shorting is less likely to occur during charge-discharge. If the porosity is not less than 30%, better ion permeability and better battery charge-discharge characteristics can be obtained.

(8) Thickness of the Polyolefin Microporous Membrane

The upper limit of the thickness of the polyolefin microporous membrane of the present invention is preferably 30 μm. The upper limit is more preferably 16 μm and most preferably 12 μm. The lower limit is 5 μm and preferably 6 μm. When the thickness is within the range described above, it is possible to maintain practical pin puncture strength and pore blocking function, which makes the membrane suitable for increases in battery capacity which will likely occur in the future.

(9) Polyolefin Microporous Membrane Roll

The microporous membrane roll obtained in the present invention preferably has a width of not less than 300 mm and a diameter of not less than 150 mm. The inside diameter of the core around which the microporous membrane is wound is preferably not less than 76 mm and more preferably not less than 152 mm. The difference between the inside diameter and outside diameter is preferably not less than 5 mm and not more than 50 mm, and the difference is adjusted in accordance with the strength of the materials that are used. The allowance of the inside diameter and outside diameter is preferably not more than ±0.5 mm and even more preferably not more than ±0.3 mm. Examples of materials for the core include paper, plastic, fiber-reinforced composite materials, and the like. If the width dimension is within the range described above, the roll can be suitably used even with increases in battery size, which will likely progress in the future. Furthermore, if the diameter dimension is within the range described above during coating the microporous membrane with a heat-resistant resin or the like, the frequency of replacing the microporous membrane roll can be reduced throughout the coating process because the roll has a sufficient winding length. In addition, the greater width can reduce the ratio of the portion lost due to trimming during slitting after coating, which yields excellent cost efficiency. In this specification, coating refers to forming a heat-resistant resin or the like on a microporous membrane, which differs from adding a lubricant such as inorganic particles to the polyolefin resin serving as the raw material of the microporous membrane. The diameter is the diameter of the entire microporous membrane roll, including the diameter of the core.

[4] Applications

The polyolefin microporous membrane of the present invention is suitable as a separator (separating material) for an electrochemical reaction device such as a battery or a capacitor. Of these, the membrane can be suitably used as a separator for a non-aqueous electrolyte secondary battery and, in particular, a lithium secondary battery. The polyolefin microporous membrane of the present invention can not only be suitably used directly as a separator, but the polyolefin microporous membrane can also be suitably used as a separator after a coating layer having a nonwoven fabric or having heat resistance or the like is laminated.

[5] Physical Property Measurement Method

The measurement method for each physical property will be described hereinafter.

(1) Thickness (Average Membrane Thickness)

A polyolefin microporous membrane was cut out to a size of 5 cm×5 cm, and 5 points were measured at the four corners and in the center. The average value thereof was used as the thickness (μm). A contact thickness meter was used for the measurements.

(2) Air Permeability

The air permeability was measured in accordance with JIS P8117 using an Oken-type air permeability meter (EGO-1T manufactured by Asahi Seiko Co., Ltd.).

(3) Pin Puncture Strength of the Polyolefin Microporous Membrane

A maximum load was measured when a needle 1 mm in diameter with a spherical tip (radius of curvature R: 0.5 mm) was pierced into a microporous membrane with a membrane thickness T1 (μm) at a speed of 2 mm/sec. The measured maximum load La was converted to the maximum load Lb normalized to a thickness of 16 μm membrane thickness by the formula: Lb=(La×16)/T1, and the pin puncture strength (gf/16 μm) was thereby obtained.

(4) Thermal Shrinkage (%)

A polyolefin microporous membrane was cut out to a size of 5 cm×5 cm, and a mark was placed at the midpoint of each side of the sample. The sample was sandwiched with paper and left to stand for 8 hours in an oven at 105° C. After the sample was removed from the oven and cooled, the lengths (cm) between the marks in the longitudinal direction and the marks the transverse direction were measured, and the thermal shrinkages in the longitudinal direction and the transverse direction were calculated with the following formula.

Thermal shrinkage (%)=(5−length (cm) between marks after heating)/5×100

(5) Crystallization Half Time $t_{1/2}$ During Isothermal Crystallization at 117° C.

The crystallization half time $t_{1/2}$ during isothermal crystallization at 117° C. can be determined by melting a sample at 230° C., measuring the change in the amount of heat when rapidly cooled to 117° C. and then held with respect to time, and finding the amount of time ($t_{1/2}$) required for the obtained heat absorption peak area to be half of the total area. Specifically, a sample is sealed in a measuring pan, heated to 230° C. using a PYRIS Diamond DSC produced by Parking Elmer, reducing the temperature to 117° C. at 30° C./min, and holding the sample at 117° C. The amount of heat as a function of time (crystallization curve) during this process was measured, and the amount of time required for the heat absorption peak area to be half of the total area was defined as the crystallization half time $t_{1/2}$ during isothermal crystallization at 117° C.

The sample was approximately 20 mg of a gel-like sheet obtained by extruding a polyethylene solution comprising a polyethylene resin and liquid paraffin and then cooling the extrudate, or approximately 20 mg of a sample obtained by melt-kneading a polyolefin microporous membrane and liquid paraffin at a weight ratio of 25:75 and then cooling the resulting solution.

(6) Curl Assessment

Figure 1:
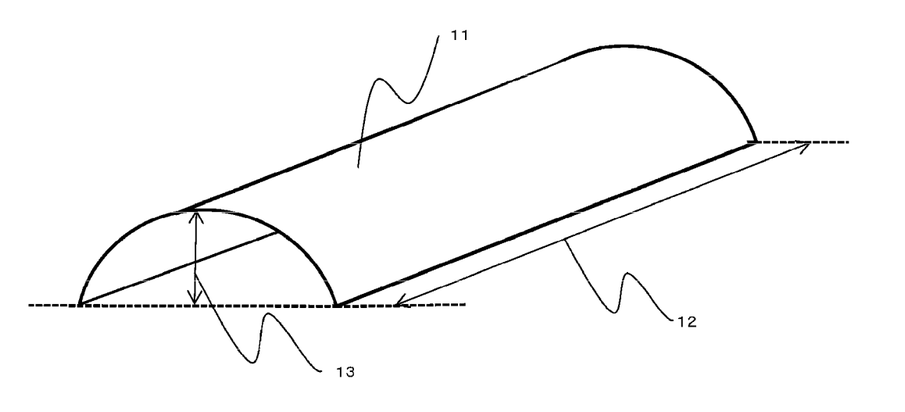
FIG. 1 is a schematic diagram of curling measurement for a polyolefin microporous membrane.

The obtained polyolefin microporous membrane was cut out to 18.5 mm in the longitudinal direction (MD) and 95 mm in the transverse direction (TD) from a roll, and left to stand on a flat horizontal surface for 30 minutes. The sample was observed from the transverse direction and evaluated based on the height to which the film rose above the flat surface, as illustrated in FIG. 1. The assessment criteria were as described below.

⊚ (Excellent): The film does not rise up when left to stand.

○ (Good): The amount of rising in the center of the film is not more than 2 mm when left to stand.

× (Poor): The amount of rising in the center of the film is greater than 2 mm when left to stand, and clear curling can be confirmed.

(7) Roll Appearance Assessment

Two-thousand meters of the obtained polyolefin microporous membrane were evaluated based on the state of wrinkles and the degree of winding deviation when slit to a width of 300 mm and wound at a travel speed of 150 m/min and a tension of 32 N/m using an FN335E slitter manufactured by Nishimura Manufacturing Co., Ltd. The assessment criteria were as described below.

⊚ (Excellent): Deviation in the range of from 0 to 1 mm on both the left and right end faces of the roll, and no wrinkles generated on the surface layer of the roll ○ (Good): Deviation in the range of from 1 to 3 mm on both the left and right end faces of the roll, and no wrinkles generated on the surface layer of the roll × (Poor): Deviation greater than 3 mm in at least one of the left and right end faces of the roll, or wrinkles generated on the surface layer or the roll (8) Weight Average Molecular Weight (Mw)

The Mw of UHMWPE and HDPE were determined by gel permeation chromatography (GPC) under the following conditions.

Measurement apparatus: GPC-150 C, manufactured by Waters Corporation

Column: Shodex UT806M, manufactured by Showa Denko, K. K.

Column temperature: 135° C.
Solvent (mobile phase): o-dichlorobenzene
Solvent flow rate: 1.0 ml/min
Sample Concentration: 0.1 wt. % (dissolution condition: 135° C./1 h)
Injection quantity: 500 µl
Detector: differential refractometer manufactured by Waters Corporation.
Calibration curve: Created using predetermined conversion constant from calibration curve obtained using monodisperse polystyrene standard sample (9) Porosity (%)

The polyolefin microporous membrane was cut out to a size of 5 cm×5 cm, and the volume ($cm^3$) and weight (g) thereof were determined. The porosity was calculated from these values and the membrane density ($g/cm^3$) using the following formula.

$$Porosity=((volume-weight/membrane\ density)/(volume))\times 100$$

Here, the membrane density was 0.99. The thickness measured in (1) above was used for the calculation of the volume.

EXAMPLES

The present invention is described below using examples. However, the present invention is not limited by these examples in any way.

Working Example 1

<Polyolefin Microporous Membrane>

A mixture was obtained by dry-blending 0.375 parts by weight of tetrakis[methylene-3-(3,5-ditertiary-butyl-4-hydroxyphenyl)-propionate]methane into 100 parts by weight of a polyethylene (PE) composition comprising 60 wt. % of an ultra-high molecular weight polyethylene (UHMWPE) having a weight average molecular weight (Mw) of $1.0\times10^6$ and 40 wt. % of a high-density polyethylene (HDPE) having a Mw of $2.8\times10^5$.

A polyethylene solution was prepared by charging 25 parts by weight of the obtained mixture into a strong kneading type twin-screw extruder (charged amount of polyethylene composition Q: 54 kg/h), supplying 75 parts by weight of liquid paraffin from a side feeder of the twin-screw extruder, and melt-kneading at a temperature of 210° C. while maintaining the screw rotation speed Ns at 180 rpm (Q/Ns: 0.3 kg/h/rpm).

The obtained polyethylene solution was supplied from the twin-screw extruder to a T-die and was extruded so as to form a sheet-like extrudate. The extrudate was cooled while being drawn with a cooling roller adjusted to a temperature of 35° C. so as to form a gel-like sheet. Here, the cooling rate of the front surface was 399° C./min and the cooling rate of the back surface was 380° C./min, where the front surface was defined as the extrudate surface in contact with the cooling roller and the back surface was defined as the extrudate surface not in contact with the cooling roller. Stretching in the longitudinal direction was performed on the obtained gel-like sheet with a roll method so that the sheet was stretched by 9 times at a stretching temperature of 115° C., and the sheet was then guided to a tenter and subjected to stretching in the transverse direction at a stretching ratio of 6 times and a stretching temperature of 115° C. The stretched membrane was washed in a washing tank of methylene chloride adjusted to a temperature of 25° C., and the liquid paraffin was removed. The washed membrane was dried with a drying furnace adjusted to 60° C., and the membrane was subjected to heat setting treatment for 40 seconds at 125° C. in a tenter so as to obtain a microporous membrane having a thickness of 16 µm. The obtained microporous membrane was slit to a width of 300 mm and a length of 2,000 m using an ABS core (inside diameter: 152.4 mm, outside diameter: 200.0 mm) so as to produce a polyolefin microporous membrane roll.

Working Examples 2 to 4 and Comparative Examples 1 to 6

Polyolefin microporous membrane rolls were produced in the same manner as in Working Example 1 with the exception that the resin compositions and the membrane production conditions of the polyolefin microporous membranes were changed as shown in Table 1.

Comparative Example 7

A gel-like sheet was produced under the same extrusion conditions as in Working Example 1 using only an HDPE having a Mw of $3.8\times10^5$. Stretching in the longitudinal direction was performed on the produced gel-like sheet so that the sheet was stretched by 9 times at a stretching temperature of 115° C., and the sheet was then subjected to stretching in the transverse direction at a stretching ratio of 6 times and a stretching temperature of 120° C. The stretched membrane was washed in a washing tank of methylene chloride adjusted to a temperature of 25° C. Tension was applied in the longitudinal direction to stretch the membrane by 3% in the extraction process in which liquid paraffin was extracted, and the membrane was contracted by approximately 12% in the transverse direction. The washed membrane was dried with a drying furnace adjusted to 60° C., and after the membrane was restretched to 120% in the transverse direction at 125° C. in a tenter, the membrane was contracted by 16.7% and subjected to heat setting for 40 seconds to obtain a microporous membrane having a thickness of 16 µm. The obtained microporous membrane was slit to a width of 300 mm and a length of 2,000 m using an ABS core (inside diameter: 152.4 mm, outside diameter: 200.0 mm) so as to produce a polyolefin microporous membrane roll.

Comparative Example 8

A gel-like sheet was produced under the same extrusion conditions as in Working Example 1 with the exception that 28.5 wt. % of an UHMWPE having a Mw of $2.5\times10^6$ and 71.5 wt. % of an HDPE having a Mw of $2.8\times10^5$ were used. The produced gel-like sheet was simultaneously biaxially stretched by 6 times in each of the longitudinal and transverse directions at a stretching temperature of 115° C. After stretching, the membrane was washed, air-dried, and subjected to heat setting treatment in the same manner as in Working Example 1 to obtain a microporous membrane having a thickness of 16 µm. The obtained microporous membrane was slit to a width of 300 mm and a length of 2,000 m using an ABS core (inside diameter: 152.4 mm, outside diameter: 200.0 mm) so as to produce a polyolefin microporous membrane roll.

Comparative Examples 9 and 10

Polyolefin microporous membrane rolls were produced in the same manner as in Comparative Example 8 with the exception that the stretching ratios in the longitudinal and transverse directions were changed as shown in Table 1.

The resin compositions and membrane production conditions of the polyolefin microporous membranes obtained in Working Examples 1 to 4 and Comparative Examples 1 to 10 are shown in Table 1, and the physical properties thereof are shown in Table 2. The crystallization half time $t_{1/2}$ in Table 2 is the crystallization half time $t_{1/2}$ of the obtained gel-like sheet during isothermal crystallization at 117° C.

TABLE 1

| | Ultra-high molecular weight PE | | High-density PE molecular weight [—] | Plasticizer concentration [wt. %] | Stretching method [—] | Stretching in longitudinal direction | | Stretching in transverse direction | |
|---|---|---|---|---|---|---|---|---|---|
| | Molecular weight [—] | Amount Added [wt. %] | | | | Magnification ratio [times] | Temperature [° C.] | Magnification ratio [times] | Temperature [° C.] |
| Working Example 1 | $1.0 \times 10^6$ | 60 | $2.8 \times 10^5$ | 75 | Sequential | 9 | 115 | 6 | 115 |
| Working Example 2 | $1.0 \times 10^6$ | 60 | $2.8 \times 10^5$ | 75 | Sequential | 7 | 115 | 6 | 115 |
| Working Example 3 | $1.0 \times 10^6$ | 40 | $2.8 \times 10^5$ | 75 | Sequential | 9 | 115 | 6 | 115 |
| Working Example 4 | $1.0 \times 10^6$ | 40 | $2.8 \times 10^5$ | 75 | Sequential | 7 | 115 | 6 | 115 |
| Comparative Example 1 | $2.5 \times 10^6$ | 40 | $2.8 \times 10^5$ | 75 | Sequential | 9 | 115 | 6 | 115 |
| Comparative Example 2 | $2.5 \times 10^6$ | 30 | $2.8 \times 10^5$ | 75 | Sequential | 7 | 115 | 6 | 115 |
| Comparative Example 3 | — | 0 | $2.8 \times 10^5$ | 75 | Sequential | 9 | 115 | 6 | 115 |
| Comparative Example 4 | — | 0 | $2.8 \times 10^5$ | 75 | Sequential | 7 | 115 | 5 | 115 |
| Comparative Example 5 | — | 0 | $2.8 \times 10^5$ | 65 | Sequential | 9 | 115 | 6 | 115 |
| Comparative Example 6 | — | 0 | $2.8 \times 10^5$ | 65 | Sequential | 7 | 115 | 6 | 115 |
| Comparative Example 7 | — | 0 | $3.8 \times 10^5$ | 60 | Sequential | 9 | 115 | 6 | 120 |
| Comparative Example 8 | $2.5 \times 10^6$ | 30 | $2.8 \times 10^5$ | 71.5 | Simultaneous | 6 | 115 | 6 | 115 |
| Comparative Example 9 | $2.5 \times 10^6$ | 30 | $2.8 \times 10^5$ | 71.5 | Simultaneous | 7 | 115 | 7 | 115 |
| Comparative Example 10 | $2.5 \times 10^6$ | 30 | $2.8 \times 10^5$ | 71.5 | Simultaneous | 8 | 115 | 8 | 115 |

TABLE 2

| | Film thickness [μm] | Porosity [%] | Pin puncture strength [gf] | Air permeability [sec/100 cc Air] | Thermal shrinkage | | Crystallization half time $t_{1/2}$ [min] | Curling assessment [—] | Roll appearance [—] |
|---|---|---|---|---|---|---|---|---|---|
| | | | | | Transverse direction [%] | Longitudinal/ width [—] | | | |
| Working Example 1 | 16 | 51 | 670 | 132 | 5.4 | 1.2 | 17 | ○ | ○ |
| Working Example 2 | 16 | 51 | 590 | 138 | 4.4 | 1.7 | 17 | ○ | ○ |
| Working Example 3 | 16 | 51 | 560 | 132 | 4.5 | 1.4 | 20 | ○ | ○ |
| Working Example 4 | 16 | 47 | 555 | 207 | 3.7 | 1.9 | 20 | ◎ | ◎ |
| Comparative Example 1 | 16 | 50 | 642 | 150 | 7.3 | 0.7 | 38 | X | X |
| Comparative Example 2 | 16 | 50 | 550 | 149 | 5.0 | 1.3 | 38 | X | X |
| Comparative Example 3 | 16 | 54 | 465 | 117 | 5.1 | 1 | 18 | ◎ | ◎ |
| Comparative Example 4 | 16 | 54 | 322 | 115 | 6.0 | 0.7 | 18 | ◎ | ◎ |
| Comparative Example 5 | 16 | 51 | 347 | 169 | 8.8 | 0.6 | 18 | ◎ | ◎ |
| Comparative Example 6 | 16 | 49 | 485 | 174 | 11.3 | 0.4 | 18 | ◎ | ◎ |
| Comparative Example 7 | 16 | 39 | 520 | 231 | — | — | 19 | ○ | ○ |
| Comparative Example 8 | 16 | 41 | 500 | 409 | 5.2 | 1 | 38 | ◎ | ◎ |

TABLE 2-continued

| | Film thickness [μm] | Porosity [%] | Pin puncture strength [gf] | Air permeability [sec/100 cc Air] | Thermal shrinkage Transverse direction [%] | Longitudinal/width [—] | Crystallization half time $t_{1/2}$ [min] | Curling assessment [—] | Roll appearance [—] |
|---|---|---|---|---|---|---|---|---|---|
| Comparative Example 9 | 16 | 42 | 513 | 279 | 7.0 | 0.9 | 38 | ◎ | ◎ |
| Comparative Example 10 | 16 | 46 | 536 | 268 | 7.4 | 0.9 | 38 | ◎ | ◎ |

It can be seen from Table 2 that the polyolefin microporous membranes of Working Examples 1 to 4 provided rolls with a good appearance which simultaneously had low air permeability and high pin puncture strength and had suppressed curling even when the polyolefin microporous membranes were relatively wide.

In addition, the crystallization half times $t_{1/2}$ during isothermal crystallization at 117° C. of 20 mg of samples obtained by melt-kneading 25 parts by weight of the polyolefin microporous membranes obtained in Working Examples 1 to 4 and Comparative Examples 1 to 10 and 75 parts by weight of liquid paraffin at 210° C. and casting the samples on a stainless steel plate are shown in Table 3.

TABLE 3

| | Crystallization half time $t_{1/2}$ [min] |
|---|---|
| Working Example 1 | 17 |
| Working Example 2 | 17 |
| Working Example 3 | 20 |
| Working Example 4 | 20 |
| Comparative Example 1 | 38 |
| Comparative Example 2 | 38 |
| Comparative Example 3 | 18 |
| Comparative Example 4 | 18 |
| Comparative Example 5 | 21 |
| Comparative Example 6 | 21 |
| Comparative Example 7 | 24 |
| Comparative Example 8 | 40 |
| Comparative Example 9 | 40 |
| Comparative Example 10 | 40 |

REFERENCE SIGN LIST

11: Polyolefin microporous membrane
12: Transverse direction (TD) of the polyolefin microporous membrane
13: Curl measurement site in longitudinal direction

The invention claimed is:

1. A polyolefin microporous membrane, comprising:
at least one microporous membrane layer,
wherein the microporous membrane layer has an air permeability between 100 sec/100 cc and 220 sec/100 cc, a pin puncture strength of at least 550 gf, and a crystallization half time $t_{1/2}$ of from 10 to 35 minutes when subjected to isothermal crystallization at 117° C., wherein the air permeability and the pin puncture strength are normalized to a thickness of 16 μm, and
wherein the microporous membrane layer comprises an ultra-high molecular weight polyethylene concentration of at least 30 wt. %, and wherein the ultra-high molecular weight polyethylene has an average molecular weight of at least $1.0 \times 10^6$ and less than $2.0 \times 10^6$.

2. The polyolefin microporous membrane according to claim 1, wherein a curl of a 18.5 mm×95 mm section of the microporous membrane layer is less than 2 mm.

3. The polyolefin microporous membrane according to claim 1, wherein a thickness of the microporous membrane layer is between 5 μm and 30 μm.

4. The polyolefin microporous membrane according to claim 1, wherein the microporous membrane layer has a shrinkage in a transverse direction at 105° C. which is less than 6%, and a shrinkage in a longitudinal direction at 105° C. which is between 1.1 and 2.0 times the shrinkage in the transverse direction.

5. A separator for a non-aqueous electrolyte secondary battery comprising a polyolefin microporous membrane comprising:
at least one microporous membrane layer,
wherein the microporous membrane layer has an air permeability between 100 sec/100 cc and 220 sec/100 cc, a pin puncture strength of at least 550 gf, and a crystallization half time $t_{1/2\ of\ from}$ 10 to 35 minutes when subjected to isothermal crystallization at 117° C., wherein the air permeability and the pin puncture strength are normalized to a thickness of 16 μm, and
wherein the microporous membrane layer comprises an ultra-high molecular weight polyethylene concentration of at least 30 wt. %, and wherein the ultra-high molecular weight polyethylene has an average molecular weight of at least $1.0 \times 10^6$ and less than $2.0 \times 10^6$.

6. A non-aqueous electrolyte secondary battery comprising the separator according to claim 5.

7. The separator according to claim 5, wherein a curl of a 18.5 mm×95 mm section of the microporous membrane layer is less than 2 mm.

8. The separator according to claim 5 wherein a thickness of the microporous membrane layer is between 5 μm and 30 μm.

9. The separator according to claim 5, wherein the microporous membrane layer has a shrinkage in a transverse direction at 105° C. which is less than 6%, and a shrinkage in a longitudinal direction at 105° C. which is between 1.1 and 2.0 times the shrinkage in the transverse direction.

10. A method of producing a polyolefin microporous membrane, the method comprising:
(a) preparing a polyolefin solution by melt-kneading:
(i) a polyolefin resin containing an ultra-high molecular weight polyethylene having a concentration of at least 30 wt. % and an average molecular weight of at least $1.0 \times 10^6$ and less than $2.0 \times 10^6$, and
(ii) a membrane-forming solvent;
(b) molding a sheet by extruding the polyolefin solution from an extruder to form an extrudate and subsequently cooling the extrudate, wherein a crystallization half time $t_{1/2}$ of the gel-like sheet between 10 and 35 minutes when subjected to isothermal crystallization at 117° C.;
(c) stretching the sheet in a longitudinal direction;
(d) stretching the sheet in a transverse direction;

(e) extracting a membrane-forming solvent from the stretched sheet; and
(f) drying the stretched sheet.

* * * * *